Patented Sept. 15, 1942

2,296,218

UNITED STATES PATENT OFFICE 2,296,218

PURIFICATION OF MALEIC ANHYDRIDE

William R. Middleton, Jr., Brunswick, Ga., assignor to Hercules Powder Company, Wilmington, Del., a corporation of Delaware No Drawing. Application October 18, 1939, Serial No. 299,970

5 Claims. (Cl. 260—343)

This invention relates to a method for the purification of maleic anhydride and more particularly to a method for the removal of volatile color imparting compounds from crude maleic anhydride produced by the catalytic partial oxidation of organic compounds such as, for example, benzene, phenol, crotonaldehyde, crotonic acid, furan, furfuryl alcohol, furfural, oxymethyl furfural, pyromucic acid, turpentine oil, cyclopentadiene, butylene, etc.

Crude maleic anhydride produced by the catalytic partial oxidation of suitable organic compounds is ordinarily refined by vacuum distillation. Such treatment results in a product which is light yellow or light greenish yellow when freshly distilled but which rapidly darkens to deep reddish amber which may even become opaque after standing a few weeks at normal temperature. Maleic anhydride of such color is not suitable for use in the manufacture of light colored synthetic resins.

This darkening in color is due to the presence of volatile compounds produced as by-products in the partial oxidation which produces the maleic anhydride. Careful fractionation of crude maleic anhydride containing such compounds will produce a small intermediate fraction of pure maleic anhydride which does not darken on standing, but such fractionation is not economically feasible in commercial processes.

Prolonged heating followed by distillation has been proposed for refining maleic anhydride. To be effective, the heating must extend for as much as 2–4 days which is not practicable on a commercial scale. Heating crude maleic anhydride with an acidifying agent of the sulphuric anhydride class, i. e., oleum, concentrated sulphuric acid, etc., followed by distillation has also been proposed. This gives a well purified product in a short time. However, the acids used are very corrosive at the temperatures employed so that equipment life is short. The acids are also rather destructive to organic matter and further tend to polymerize all unsaturated compounds at the temperatures employed so that there is loss of product due to charring and resinification.

It is the object of this invention to improve over these prior methods by providing a method by which the volatile color imparting compounds may be removed from crude maleic anhydride effectively and in a practicable manner, avoiding corrosive and destructive reagents, and obtaining a high yield of purified maleic anhydride.

By the method in accordance with this invention, I subject crude maleic anhydride in the liquid state to heating with a relatively non-corrosive and non-destructive agent which causes modification or reaction of the color imparting compounds to less volatile or non-volatile materials but which is not destructive to maleic anhydride. I then subject the treated material to distillation whereby the maleic anhydride is obtained in the form of a high grade product of very low color, resistant to darkening on aging. I employ as my modification agent a suitable metal compound from the group consisting of halides of polyvalent metals and bases of the metals of groups I and II of the periodic table.

Suitable modification agents which I may add to the crude maleic anhydride to be purified are, for example, polyvalent metal halides such as ferrous chloride, ferric chloride, zinc chloride, aluminum chloride, etc., and the bromine and iodine equivalents; and bases of metals of groups I and II of the periodic system, that is, such oxides and hydroxides as sodium hydroxide, potassium hydroxide, lithium hydroxide, sodium oxide, potassium oxide, zinc hydroxide, zinc oxide, magnesium hydroxide, magnesium oxide, calcium oxide, etc. It is considered that upon addition to the crude maleic anhydride, some of the agents probably react with a small portion of the maleic anhydride and/or its impurities, the bases probably forming maleates. However, the exact nature of any such products formed and the manner in which the modifying agents produce their results is not known. Hence, the modifying agents will be referred to in terms of the compounds which are added to the maleic anhydride although it will be understood that the agents include the compounds per se or any reaction products of the compounds with the components of crude maleic anhydride.

The modification treatment which I employ may be a treatment at a temperature above the melting point of crude maleic anhydride, but below the decomposition or polymerization temperature of the maleic anhydride itself. This treatment may be carried out at a temperature within the range of about 60° C. to about 210° C. When treating crude maleic anhydride substantially free of maleic acid, I prefer to use a temperature near the upper end of the range since at the higher temperatures the desired result is obtained much more rapidly than at a lower temperature. Thus, I may carry out the modification treatment at or near the reflux temperature of crude maleic anhydride, for example, at a temperature within the range of about 170° C. to about 202° C. This treatment is then followed by distillation of the maleic anhydride, preferably under vacuum.

When treating crude maleic anhydride which contains an appreciable amount of maleic acid, I prefer to utilize a lower temperature, for example, within the range of about 60° C. to about 100° C. and thus, substantially avoid isomerizing the maleic acid to fumaric acid. This treatment is then followed by distillation, preferably under vacuum, to obtain maleic anhydride as a purified water-white product.

The amount of modification agent which I may utilize will, of course, depend upon the particular agent employed. Ordinarily, I find that it is unnecessary to utilize more than a small amount, and that an amount within the range of about 0.1 part to about 2.0 parts per 100 parts of the crude maleic anhydride is sufficient. The length of the treatment which forms the first step in my process will depend upon the temperature utilized. When using a temperature within the range of about 60° C. to about 100° C., a period of about 1 hour to about 6 hours will be required. However, the maleic anhydride is not destroyed or altered by prolonging the treatment when using the agents according to this invention. When using a temperature at or near the reflux of maleic anhydride, a period of about 10 minutes to about 30 minutes will be required.

As specific illustrations of the procedure for the purification of maleic anhydride in accordance with this invention the following examples may be cited. In these examples, the colors recorded are based on the Lovibond color glass scale, series 500 amber and 200 red. Colors were measured at liquid depths of 50.0 mm.

One hundred parts by weight of dark crude maleic anhydride having a color in excess of 35 amber at a depth of 50 mm. was mixed with 0.5 to 2 parts by weight of a modification agent as indicated in Table I while maintained in the molten condition at the temperature specified for 16–21 hours. The maleic anhydride was then distilled under a vacuum of 28–29 inches into a receiver. The pure maleic anhydride obtained as a condensate was found in each case to have substantially no color. By way of comparison, the crude maleic anhydride when vacuum distilled without the treatment with a modification agent gave a product with a color of 6.0 amber.

Table I

| Ex. No. | Modification agent | Parts of catalyst per 100 parts of crude anhydride | Temperature of heat treatment °C. | Color of distilled product (Lovibond) | Percentage of refined product recovered |
|---|---|---|---|---|---|
| 1 | NaOH | 2 | 90–95 | 1.0 amber | 96.0 |
| 2 | ZnO | 2 | 90–95 | 1.0 amber | 92.4 |
| 3 | $FeCl_3$ | 1 | 65–75 | 0.0 amber | 93.5 |
| 4 | $ZnCl_2$ | 0.5 | 90–95 | 1.0 amber | 97.3 |
| 5 | $FeCl_3 \cdot 4H_2O$ | 1 | 65–85 | 1.0 amber | 93.4 |

Examples 1 to 5 illustrate the high yield of refined product obtainable according to the method of this invention. In view of the inevitable small loss in the distillation step, the yields are very near to quantitative. These yields were obtained even though the treatment was extended for a period considerably longer than necessary.

To illustrate more expedient purification, in which the first step of my process required only one hour, the examples of Table II are given. For these examples, a crude maleic anhydride, having a color in excess of 35 amber (Lovibond scale), which when distilled without a modification treatment, gave a color of 7.0 amber and 8.5 amber respectively in two different distillations, was utilized. The procedure followed was the same as that utilized in the previous examples with the exception of the conditions specifically noted in the table and the use of a treating step of only one hour. It will be noted that an excellent product was obtained under moderate conditions in a short time.

Table II

| Ex. No. | Modification agent | Parts of catalyst per 100 parts of crude anhydride | Temperature of heat treatment | Color of distilled product (Lovibond) |
|---|---|---|---|---|
| 6 | $FeCl_3$ | 2 | 90–95 | 1.0 amber. |
| 7 | $ZnCl_2$ | 2 | 90–95 | 1.0 amber. |
| 8 | $AlCl_3$ | 1 | 100 | 0.5 amber. |

The products in accordance with this invention have a valuable property not shown by the figures in the tables. They are stable in color. To illustrate this property, a comparison was made between distilled maleic anhydride and the product according to this invention. Crude maleic anhydride, used in Examples 6, 7 and 8, having a color in excess of 35 amber was distilled giving, in two determinations, products with colors of 7.0 amber and 8.5 amber respectively. However, after standing 22 days, the colors became 43 amber and 80 amber respectively. Two products obtained according to the method of this invention, upon standing 28 days showed a color increase of 0.4 and 0.7 amber, the total color being no more than 2 amber, which is substantially no change at all.

It will be understood that the details and examples hereinbefore set forth are illustrative only and that the invention as broadly described and claimed is in no way limited thereby.

What I claim and desire to protect by Letters Patent is:

1. A method for the purification of crude maleic anhydride containing colored impurities and impurities which darken on standing, which consists in subjecting the crude maleic anhydride in liquid state to treatment at a temperature within the range between about 60° C. and about 210° C. with a metal compound selected from the group consisting of the oxides and hydroxides of sodium, potassium, lithium, calcium, zinc and magnesium, and the halides of zinc, iron and aluminum, and reaction products thereof with maleic anhydride, to effect a reduction in the volatility of color-forming volatile impurities without appreciably altering or destroying the maleic anhydride, and then distilling the treated maleic anhydride to recover a high yield of maleic anhydride which is substantially colorless both initially and upon standing for long periods of time, leaving the colored and darkening impurities in the distillation residue.

2. A method for the purification of crude maleic anhydride containing colored impurities and impurities which darken on standing, which consists in subjecting the crude maleic anhydride in liquid state to treatment at a temperature within the range between about 60° C. and about 210° C. with an iron halide to effect a reduction in the volatility of color-forming volatile impurities without appreciably altering or destroying the maleic anhydride, and then distilling the maleic anhydride to recover in high yield maleic anhydride which is substantially colorless both initially and upon standing for long periods of time, leaving the colored and darkening impurities in the residue.

3. A method for the purification of crude maleic anhydride containing colored impurities and impurities which darken on standing, which consists in subjecting the crude maleic anhydride in liquid state to treatment at a temperature within the range between about 60° C. and about 210° C. with ferric chloride to effect a reduction in the volatility of color-forming volatile impurities without appreciably altering or destroying the maleic anhydride, and then distilling the maleic anhydride to recover in high yield maleic anhydride which is substantially colorless both initially and upon standing for long periods of time, leaving the colored and darkening impurities in the residue.

4. A method for the purification of crude maleic anhydride containing colored impurities and impurities which darken on standing, which consists in subjecting the crude maleic anhydride in liquid state to treatment at a temperature within the range between about 60° C. and about 210° C. with zinc chloride to effect a reduction in the volatility of color-forming volatile impurities without appreciably altering or destroying the maleic anhydride, and then distilling the maleic anhydride to recover in high yield maleic anhydride which is substantially colorless both initially and upon standing for long periods of time, leaving the colored and darkening impurities in the residue.

5. A method for the purification of crude maleic anhydride containing colored impurities and impurities which darken on standing, which consists in subjecting the crude maleic anhydride in liquid state to treatment at a temperature within the range between about 60° C. and about 210° C. with sodium hydroxide to effect a reduction in the volatility of color-forming volatile impurities without appreciably altering or destroying the maleic anhydride, and then distilling the maleic anhydride to recover in high yield maleic anhydride which is substantially colorless both initially and upon standing for long periods of time, leaving the colored and darkening impurities in the residue.

WILLIAM R. MIDDLETON, Jr.